No. 751,141. PATENTED FEB. 2, 1904.
R. G. BEKER.
UPSETTING MACHINE.
APPLICATION FILED JUNE 15, 1903.
NO MODEL.
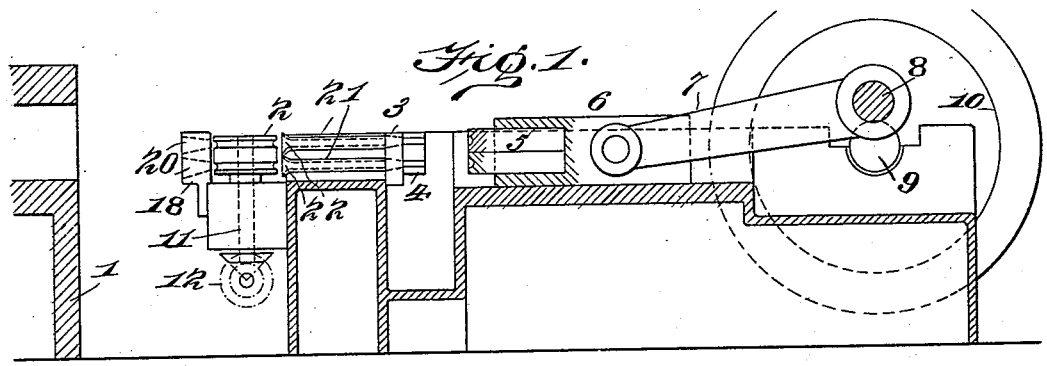
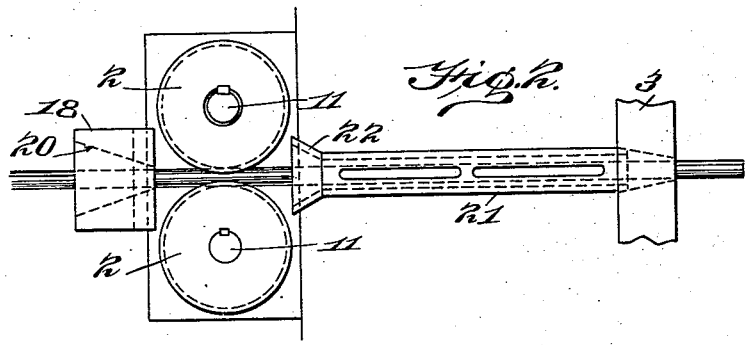
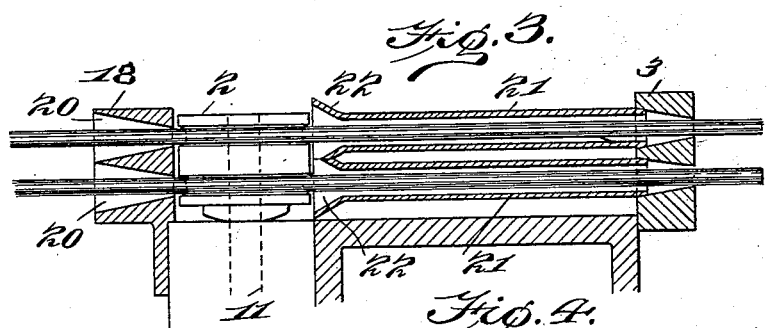
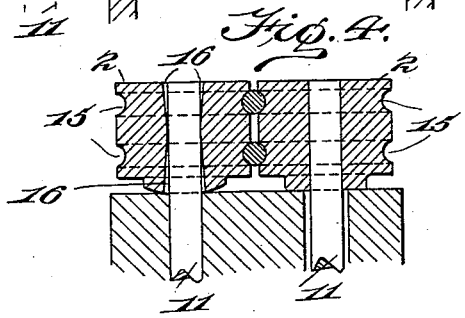
WITNESSES: INVENTOR
Robt. C. Totten Rudolph G. Beker
H. G. Dieterich By Kay Totten & Winter
ATTORNEYS No. 751,141. Patented February 2, 1904.

UNITED STATES PATENT OFFICE.

RUDOLPH G. BEKER, OF PITTSBURG, PENNSYLVANIA, ASSIGNOR OF TWO-THIRDS TO FREDERICK H. KINDL, OF PITTSBURG, PENNSYLVANIA.

UPSETTING-MACHINE.

SPECIFICATION forming part of Letters Patent No. 751,141, dated February 2, 1904.

Application filed June 15, 1903. Serial No. 161,614. (No model.)

*To all whom it may concern:*

Be it known that I, RUDOLPH G. BEKER, a resident of Pittsburg, in the county of Allegheny and State of Pennsylvania, have invented a new and useful Improvement in Upsetting-Machines; and I do hereby declare the following to be a full, clear, and exact description thereof.

My invention relates to metal-upsetting machines; and its object is to provide feeding mechanism for upsetting-machines whereby a plurality of stock-rods can be fed with uniformity and certainty even though they should vary in diameter.

In upsetting-machines the usual practice is to feed the stock-rods to the shearing and gripping dies and upsetting-punch by means of power-driven rollers, which are provided with peripheral grooves for engaging the stock-rods.

The object of my invention is to provide feeding-rollers having a plurality of feeding-faces, at least one of which rollers is so mounted that it can change its axial relation to the other roller, and thus give equal pressure to a plurality of stock-rods and feed them forward with uniformity and certainty even though said rods should vary in diameter.

In the accompanying drawings, Figure 1 is a vertical longitudinal section through an upsetting-machine, showing my invention applied thereto. Fig. 2 is a plan view of the feeding and guiding means. Fig. 3 is a vertical longitudinal section through the same, and Fig. 4 is a vertical transverse section through the feeding-rollers.

The furnace for heating the stock-rods is shown at 1, the feeding-rollers at 2, the stationary shearing or breastplate at 3, the movable shearing and gripping jaw at 4, and the upsetting-punch at 5. The latter is connected to a slide 6, which is reciprocated by means of a connecting-rod 7, attached to a crank 8 on a shaft 9, the latter being provided with a fly-wheel 10. The feeding-rollers 2 are mounted on vertical shafts 11 and driven by the bevel-gears 12. Means are also provided for separating said rollers; but as this forms no part of the present invention the same is not shown, but it is the same as is shown and described in my application for patent filed March 1, 1902, Serial No. 96,240. All other parts of the machine so far described are also substantially the same as shown in my prior application. The mechanism for moving the movable shearing and gripping die has been omitted from the drawings, as it forms no part of the present invention.

The feeding-rollers 2 are each provided with two annular peripheral feeding-faces, which have been shown as grooves 15, so that thereby two stock-rods can be simultaneously fed to the shearing and upsetting mechanism. In order that these rollers may feed both stock-rods forward with certainty and uniformity, at least one of said rollers is so mounted that it may change its axial position—as, for instance, by being provided with a double conical bore 16, through which its shaft 11 passes. As a result of this the roller has bearing with its shaft only at its central portion, and it can freely oscillate on its shaft, thus adapting itself to various positions and enabling it to apply uniform pressure on both stock-rods even though the latter should not be of the same diameter.

In front of the feeding-rollers is a block 18, which is provided with a plurality of funnel-shaped openings 20, one leading to each of the feeding-grooves 15. These funnel-shaped openings serve as guides to direct the stock-rod to the rollers. Between the feeding-rollers and the breastplate 3 are tubular guides 21, one for each stock-rod, being funnel-shaped at their entrance ends 22 and in close proximity to the feeding-rollers 2 and extending at their opposite ends into the openings in the breastplate 3. The openings through these guides are sufficiently large to prevent their clogging with scale, but not so large that two stock-rods can lie side by side therein. As a consequence the rear of one stock-rod when it is so short that it will no longer be gripped in the feeding-rollers will be pushed forward by the next succeeding stock-rod and thus worked up into bolts or rivets. This prevents the formation of unnecessary scrap, which heretofore has arisen by reason of the fact that when a stock-rod became so short that it was no longer gripped by the feeding-rollers it had to be taken out and thrown away. These guides also prevent the ends of the stock-rods from jumping out or escaping before reaching the breastplate. It is not necessary that these guides be tubes, as a series of short tubular or funnel sections or a series of rods arranged in a circle to leave a central opening will answer the purpose equally as well, it merely being necessary to have means which provide an inclosed passage from the rollers to the breastplate.

My improved feeding device, it will be observed, insures the feeding of two stock-rods with certainty and uniformity and also prevents the formation of unnecessary scrap, enabling the entire stock-rod to be worked up with the exception of such scrap ends as are of less length than one complete upset article.

What I claim as my invention, and desire to secure by Letters Patent, is—

1. Feeding mechanism for upsetting and like machines comprising a pair of rollers each provided with a pair of feeding-faces, and means for driving said rollers, one of said rollers being so mounted that it can oscillate about a point intermediate its ends in order to vary its axial position with reference to the other roller.

2. Feeding mechanism for upsetting and similar machines comprising a pair of rollers each provided with two feeding-faces, and driven shafts on which said rollers are mounted, one of said rollers having an enlarged bore and an annular projection in said bore, whereby said roller bears against its shaft at one point only and can vary its axial position with reference to the other roller.

3. Feeding mechanism for upsetting and similar machines comprising a pair of rollers each provided with two feeding-faces, and driven shafts on which said rollers are mounted, one of said rollers being provided with a bore flaring toward both ends, whereby said roller bears against its shaft at its central portion only.

In testimony whereof I, the said RUDOLPH G. BEKER, have hereunto set my hand.

RUDOLPH G. BEKER.

Witnesses:
ROBERT C. TOTTEN,
G. KREMER.